US011177755B2

(12) United States Patent
Akutsu

(10) Patent No.: US 11,177,755 B2
(45) Date of Patent: Nov. 16, 2021

(54) ROTARY ELECTRIC MACHINE APPARATUS

(71) Applicant: Mitsubishi Electric Corporation, Tokyo (JP)

(72) Inventor: Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/753,054

(22) PCT Filed: Mar. 2, 2018

(86) PCT No.: PCT/JP2018/008041
§ 371 (c)(1),
(2) Date: Apr. 2, 2020

(87) PCT Pub. No.: WO2019/135293
PCT Pub. Date: Nov. 7, 2019

(65) Prior Publication Data
US 2020/0321899 A1 Oct. 8, 2020

(30) Foreign Application Priority Data

Jan. 5, 2018 (JP) .............................. JP2018-000504

(51) Int. Cl.
*H02P 25/18* (2006.01)
*H02P 25/22* (2006.01)

(52) U.S. Cl.
CPC .............. *H02P 25/18* (2013.01); *H02P 25/22* (2013.01)

(58) Field of Classification Search
CPC ................................ H02P 25/18; H02P 25/22
See application file for complete search history.

(56) References Cited

U.S. PATENT DOCUMENTS 3,624,471 A * 11/1971 Japp ........................... H02P 1/32
318/771
4,609,858 A * 9/1986 Sugita .................. D03D 51/002
139/1 E
(Continued)

FOREIGN PATENT DOCUMENTS

EP       3 001 548 A1      3/2016
EP         3001548 A1 *    3/2016  ................ H02J 4/00
(Continued)

OTHER PUBLICATIONS

Extended European Search Report dated Jan. 20, 2021 from the European Patent Office in EP Application No. 18898520.4.
(Continued)

*Primary Examiner* — Thai T Dinh
(74) *Attorney, Agent, or Firm* — Sughrue Mion, PLLC; Richard C. Turner

(57) ABSTRACT

To provide a rotary electric machine apparatus which can make the rotary electric machine output torque, and can change characteristics of a rotary electric machine according to change of the DC power voltage, even if failure occurs in one DC power source. A rotary electric machine apparatus (1) is provided with a power source switching mechanism (23) that switches between the DC power of low voltage and the DC power of high voltage; a winding connection switching mechanism (24) that switches interconnection of the plural-phase windings between a first winding connection state, and a second winding connection state in which an induced voltage constant of windings becomes lower than the first winding connection state; a inverter (12) provided with the switching devices; and a controller (25) that switches the power source switching mechanism (23), switches the winding connection switching mechanism (24), and controls on/off of the switching devices.

9 Claims, 8 Drawing Sheets

(56) References Cited

U.S. PATENT DOCUMENTS

| | | | | |
|---|---|---|---|---|
| 6,476,571 B1* | 11/2002 | Sasaki | ................... | B60W 10/08 |
| | | | | 318/139 |
| 6,680,997 B2* | 1/2004 | Das | ........................... | H02P 6/08 |
| | | | | 318/400.09 |
| 9,746,216 B2* | 8/2017 | Yamakawa | ............. | F25B 30/02 |
| 2013/0264981 A1 | 10/2013 | Taniguchi | | |
| 2015/0168033 A1* | 6/2015 | Yamakawa | ............. | F25B 30/02 |
| | | | | 62/324.6 |
| 2016/0090189 A1* | 3/2016 | Wangemann | ........... | F04D 13/06 |
| | | | | 60/698 |
| 2018/0175757 A1 | 6/2018 | Tanimoto et al. | | |
| 2018/0254732 A1* | 9/2018 | Smolenaers | ............... | H02J 7/02 |
| 2019/0077441 A1 | 3/2019 | Sakashita | | |

FOREIGN PATENT DOCUMENTS

| | | | |
|---|---|---|---|
| JP | 2003-214352 A | | 7/2003 |
| JP | 2003214352 A | * | 7/2003 |
| JP | 2013-219868 A | | 10/2013 |
| JP | 2014-7823 A | | 1/2014 |
| WO | 2016194535 A1 | | 12/2016 |
| WO | 2017175466 A1 | | 10/2017 |

OTHER PUBLICATIONS

Office Action dated Mar. 17, 2021 from the Intellectual Property Office of India in IN Application No. 202027021662.

* cited by examiner

ROTARY ELECTRIC MACHINE APPARATUS

CROSS-REFERENCE TO RELATED APPLICATIONS

This is a National Stage of International Application of PCT/JP2018/008041 filed Mar. 2, 2018, claiming priority based on Japanese Patent Application No. 2018-000504 filed on Jan. 5, 2018, the contents of all of which are incorporated herein by reference in their entirety.

TECHNICAL FIELD

The present disclosure is related to a rotary electric machine apparatus using two DC power sources with different voltages.

BACKGROUND ART

About the above rotary electric machine apparatus, for example, the technology described in PLT 1 is known. In the technology of PLT 1, 2 sets of three-phase windings are provided in one stator, and 2 sets of inverters are provided for each three-phase windings. That is to say, the first stator windings 11, the first inverter INV1 for the first stator windings 14, the second stator windings 16, and the second inverter INV2 for the second stator windings 16 are provided. The DC power of the second battery 22 of high voltage is supplied to the second inverter INV2. The switch is switched so that the DC power of the first battery 20 of low voltage is supplied to the first inverter INV1 in low rotational speed, and the DC power of the second battery 22 of high voltage is supplied to the first inverter INV1 in high rotational speed. The first and the second stator windings 14, 16 are fixed to Y connection.

CITATION LIST

Patent Literature

PLT 1: JP 2013-219868 A

SUMMARY OF INVENTION

Technical Problem

However, in the technology of PLT 1, when the second battery 22 of high voltage is failed, since the DC power is not supplied to the second inverter INV2 and the second stator windings 16, the output of the rotary electric machine drops. When the second battery 22 of high voltage is failed, if the switch is switched in high rotational speed so that the DC power of the second battery 22 of high voltage is supplied to the first inverter INV1, the DC power is no longer supplied to the first inverter INV1 and the first stator windings 14, and the output of the rotary electric machine becomes zero.

On the other hand, when the first battery 20 of low voltage is failed, if the switch is switched in low rotational speed so that the DC power of the first battery 20 is supplied to the first inverter INV1, the DC power is no longer supplied to the first inverter INV1 and the first stator windings 14, and the output of the rotary electric machine drops. Therefore, in the technology of PLT 1, when failure occurred in one DC power source, there is a problem that the output of the rotary electric machine drops.

In the technology of PLT 1, since the first stator windings 14 is fixed to Y connection, the induced voltage constant of the first stator windings 14 is a fixed value. Accordingly, in the technology of PLT 1, in low rotational speed in which the induced voltage generated in the first stator windings 14 becomes low, the DC power of the first battery 20 of low voltage is supplied correspondingly. And, in high rotational speed in which the induced voltage generated in the first stator windings 14 becomes high, the DC power of the second battery 22 of high voltage is supplied correspondingly. However, as mentioned above, when failure occurred in the first or the second battery, the power source voltage is no longer changed in accordance with the induced voltage which changes according to rotational speed, there is a problem that the performance of the rotary electric machine drops.

Thus, it is desirable to provide a rotary electric machine apparatus which can make the rotary electric machine output torque, and can change characteristics of a rotary electric machine according to change of the DC power voltage, even if failure occurs in one DC power source.

Solution to Problem

A rotary electric machine apparatus according to the present disclosure including:

a first power source connection terminal to which a first DC power source is connected;

a second power source connection terminal to which a second DC power source whose voltage is lower than the first DC power source is connected;

a power source switching mechanism that switches between a DC power supplied to the first power source connection terminal and a DC power supplied to the second power source connection terminal, and outputs;

a rotary electric machine body having plural-phase windings;

a winding connection switching mechanism that switches interconnection of the plural-phase windings between a first winding connection state, and a second winding connection state in which an induced voltage constant of windings becomes lower than the first winding connection state;

an inverter that is provided with switching devices, and converts a DC power outputted from the power source switching mechanism into an AC power supplied to the plural-phase windings; and a controller that switches the power source switching mechanism, switches the winding connection switching mechanism according to a switching state of the power source switching mechanism, and drives on/off the switching devices to control the rotary electric machine body based on the switching state of the power source switching mechanism and a switching state of the winding connection switching mechanism.

Advantage of Invention

According to the rotary electric machine apparatus of the present disclosure, since the power source switching mechanism is switched to the state where the DC power of the first DC power source of high voltage is outputted, or the state where the DC power of the second DC power source of low voltage is outputted, for example, when abnormality occurs in one DC power source, the rotary electric machine apparatus can be operated using the other DC power source. Then, since the winding connection switching mechanism is switched to the first winding connection state where the induced voltage constant of windings is high, or the second winding connection state where the induced voltage constant of windings is low, according to the switching state of the power source switching mechanism, the induced voltage constant of windings can be changed appropriately according to change of the DC voltage. Then, according to change of the DC voltage and change of the induced voltage constant of windings, the switching devices of the inverter is controlled on/off appropriately, and the rotary electric machine body can be controlled. Therefore, even if failure occurs in one DC power source, the rotary electric machine can output torque, and characteristics of the rotary electric machine can be changed appropriately according to change of the DC power voltage.

DETAILED DESCRIPTION OF THE EMBODIMENTS

Embodiment 1

Figure 1:
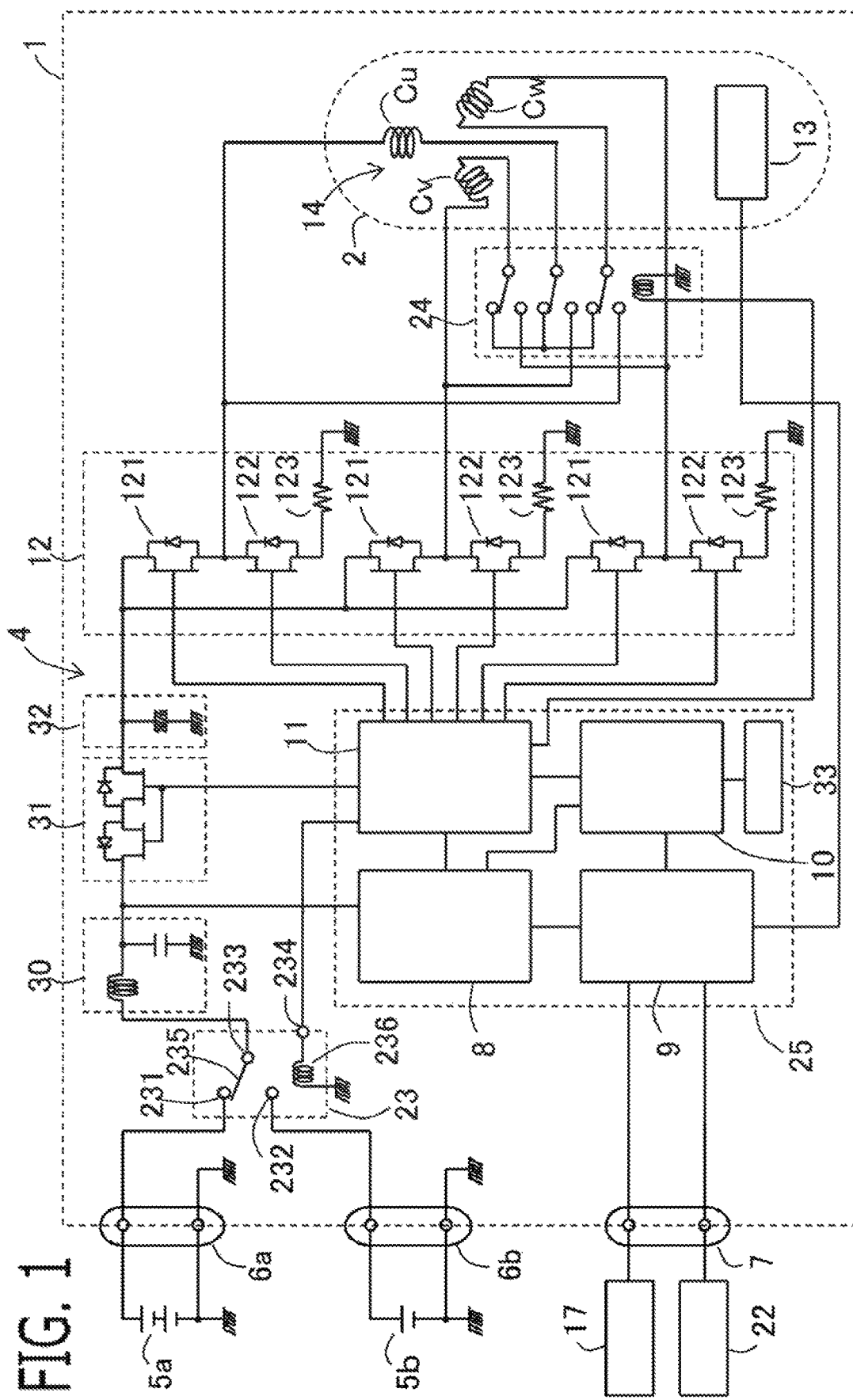
FIG. 1 is a circuit diagram of the rotary electric machine apparatus according to Embodiment 1.

A rotary electric machine apparatus 1 according to Embodiment 1 will be explained with reference to drawings. FIG. 1 is a circuit diagram of the rotary electric machine apparatus 1 according to the present embodiment.

The rotary electric machine apparatus 1 is provided with a first power source connection terminal 6a, a second power source connection terminal 6b, a power source switching mechanism 23, a rotary electric machine body 2, a winding connection switching mechanism 24, an inverter 12, and a controller 25. In the present embodiment, the rotary electric machine apparatus 1 is mounted on a vehicle. As described in detail later, a driving force of the rotary electric machine body 2 is a driving force source of a steering device of vehicle, and the rotary electric machine apparatus 1 constitutes an electric power steering apparatus.

<Power Source Connection Terminal>

The first power source connection terminal 6a is a connection terminal to which the first DC power source 5a is connected. The second power source connection terminal 6b is a connection terminal to which the second DC power source 5b whose voltage is lower than the first DC power source 5a is connected. The first and the second DC power sources 5a, 5b are provided outside the rotary electric machine apparatus 1. The first DC power source 5a is a DC power source of 48V, for example, and is a high voltage battery, such as a lithium ion secondary battery, or a DC voltage obtained by stepping down or stepping up an output voltage of a battery. The second DC power source 5b is a lead battery of 12V, for example.

Each of the first and the second power source connection terminals 6a, 6b is provided, with a positive electrode side terminal and a negative electrode side terminal. The positive electrode side terminal of the first power source connection terminal 6a is connected to a positive electrode of the first DC power source 5a, and the negative electrode side terminal of the first power source connection terminal 6a is connected to a negative electrode of the first DC power source 5a. The positive electrode side terminal of the second power source connection terminal 6b is connected to a positive electrode of the second DC power source 5b, and the negative electrode side terminal of the second power source connection terminal 6b is connected to a negative electrode of the second DC power source 5b.

<Power Source Switching Mechanism 23>

The power source switching mechanism 23 is a switching mechanism which switches between the DC power supplied to the first power source connection terminal 6a from the first DC power source 5a, and the DC power supplied to the second power source connection terminal 6b from the second DC power source 5b, and outputs it. The power source switching mechanism 23 is provided with a first input terminal 231, a second input terminal 232, an output terminal 233, and a driving terminal 234 into which a control signal of the controller 25 is inputted. In the present embodiment, the power source switching mechanism 23 is an electromagnetic switch, and is provided with a movable contact 235 and a coil 236 which drives the movable contact 235. One end of the coil 236 is connected to the driving terminal 234. The power source switching mechanism 23 moves the movable contact 235, when the controller 25 changes the conduction state to the coil 236. Accordingly, a first power source connection state in which the movable contact 235 connects the first input terminal 231 and the output terminal 233, and a second power source connection state in which the movable contact 235 connects the second input terminal 232 and the output terminal 233 are switched. The power source switching mechanism 23 may be configured by combining a plurality of switching devices.

The first input terminal 231 is connected to the positive electrode side terminal of the first power source connection terminal 6a. The negative electrode side terminal of the first power source connection terminal 6a is connected to the common ground. The second input terminal 232 is connected to the positive electrode side terminal of the second power source connection terminal 6b. The negative electrode side terminal of the second power source connection terminal 6b is connected to the common ground.

The output terminal 233 is connected to the positive pole wire of the inverter 12, and supplies DC power of the first or the second DC power source to the inverter 12. The negative pole wire of the inverter 12 is connected to the common ground. On a connection path between the output terminal 233 and the positive pole wire of the inverter 12, a low pass filter circuit 30, a power source relay circuit 31, and a smoothing capacitor 32 are provided. The output terminal 233 is connected also to a power supply circuit 8 of the controller 25, and supplies DC power of the first or the second DC power sources 5a, 5b to the controller 25.

<Rotary Electric Machine Body 2>

The rotary electric machine body 2 is provided with plural-phase windings 14. In the present embodiment, the rotary electric machine body 2 is provided with three-phase windings Cu, Cv, Cw of U phase, V phase, and W phase, as the plural-phase windings 14. The rotary electric machine body 2 is a permanent magnet synchronous rotary electric machine whose stator is provided with three-phase-windings Cu, Cv, Cw, and whose rotor is provided with the permanent magnet.

Figure 4:
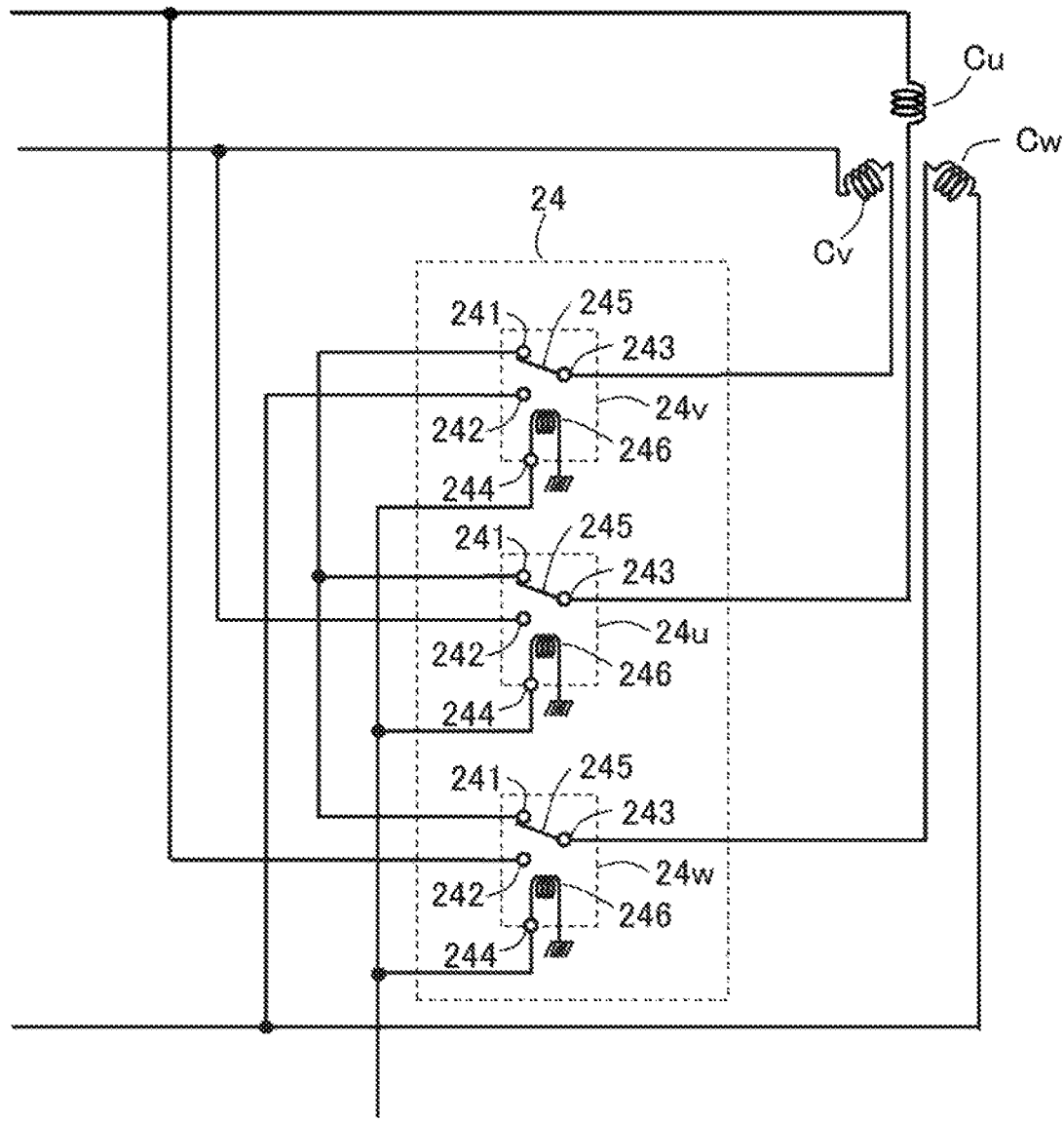
FIG. 4 is a circuit diagram of the winding connection switching mechanism according to Embodiment 1.

As shown in FIG. 1 and FIG. 4, one end of the winding Cu of U phase is connected to a connection point of two switching devices for U phase of the inverter 12 described below, and the other end of the winding Cu of U phase is connected to a changeover switch 24u of U phase of the winding connection switching mechanism 24. One end of winding Cv of V phase is connected to a connection point of two switching devices for V phase of the inverter 12, and the other end of winding Cv of V phase is connected to a changeover switch 24v of V phase of the winding connection switching mechanism 24. One end of winding Cw of W phase is connected to a connection point of two switching devices for W phase of the inverter 12, and the other end of winding Cw of W phase is connected to a changeover switch 24w of W phase of the winding connection switching mechanism 24.

The rotary electric machine body 2 is provided with a rotation sensor 13, such as a resolver and a rotary encoder, for detecting a rotational angle (magnetic pole position) of the rotor. The output signal of the rotation sensor 13 is inputted into the input circuit 9 of the controller 25.

<Winding Connection Switching Mechanism 24>

The winding connection switching mechanism 24 is a switching mechanism that switches interconnection of the plural-phase windings 14 between a first winding connection state, and a second winding connection state in which an induced voltage constant of windings becomes lower than the first winding connection state. In the present embodiment, the winding connection switching mechanism 24 is a switching mechanism which switches interconnection of the three-phase-windings Cu, Cv, Cw between Y connection as the first winding connection state, and Δ connection as the second winding connection state.

Figure 2:
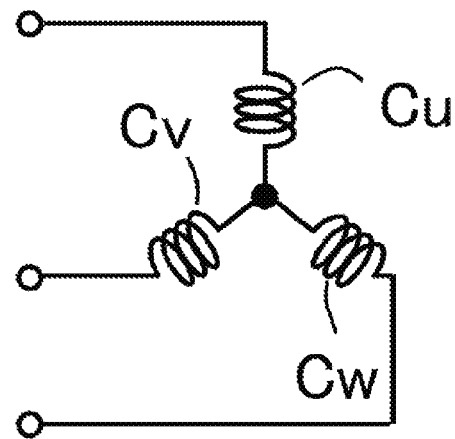
FIG. 2 is a figure showing Y connection of the three-phase windings according to Embodiment 1.
Figure 3:
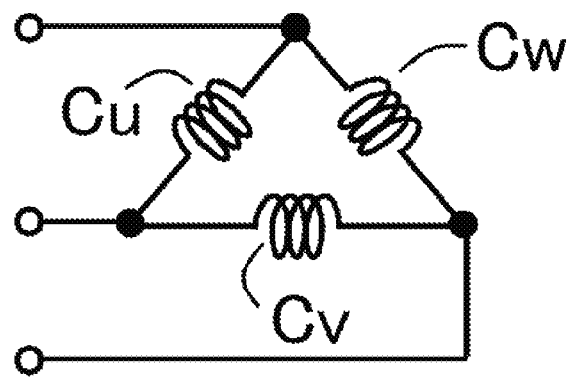
FIG. 3 is a figure showing Δ connection of the three-phase windings according to Embodiment 1.

The Y connection becomes connection as shown in FIG. 2; the other end of the winding Cu of U phase, the other end of winding Cv of V phase, and the other end of winding Cw of W phase are connected mutually; and one end of the winding Cu of U phase, one end of winding Cv of V phase, and one end of winding Cw of W phase are connected to the switching devices of corresponding phase, respectively. The Δ connection becomes connection as shown in FIG. 3; and the other end of winding Cu of U phase is connected to one end of winding Cv of V phase, the other end of winding Cv of V phase is connected to one end of winding Cw of W phase, and the other end of winding Cw of W phase is connected to one end of the winding Cu of U phase. One end of winding Cu of U phase, one end of winding Cv of V phase, and one end of winding Cw of W phase are connected to the switching devices of corresponding phase, respectively.

An induced voltage constant of the Y connection becomes $\sqrt{3}$ times (1.732 times) larger than an induced voltage constant of the Δ connection. The winding resistor between the lines of the Y connection becomes 3 times larger than the winding resistor between the lines of the Δ connection.

As shown in FIG. 1 and FIG. 4, the winding connection switching mechanism 24 has a changeover switch 24u of U phase, a changeover switch 24v of V phase, and a changeover switch 24w of W phase. The changeover switch 24u, 24v, 24w of each phase is provided with a first input terminal 241, a second input terminal 242, an output terminal 243, and a driving terminal 244 into which the control signal of the controller 25 is inputted. In the present embodiment, the changeover switch of each phase is an electromagnetic switch, and is provided with a movable contact 245, and a coil 246 which drives the movable contact 245. One end of the coil 246 is connected to the driving terminal 244. The winding connection switching mechanism 24 may be configured by combining a plurality of switching devices.

The output terminal 243 of the changeover switch 24u of U phase is connected to the other end of the winding Cu of U phase. The second input terminal 242 of the changeover switch 21u of U phase is connected to one end of winding Cv of V phase in order to form the Δ connection. In order to form the Y connection, the first input terminal 241 of the changeover switch 24u of U phase, the first input terminal 241 of the changeover switch 24v of V phase, and the first input terminal 241 of the changeover switch 24w of W phase are connected mutually, and the other ends of three-phase-windings Cu, Cv, Cw are short-circuited mutually.

The output terminal 243 of the changeover switch 24v of V phase is connected to the other end of winding Cv of V phase. The second input terminal 242 of the changeover switch 24v of V phase is connected to one end of winding Cw of W phase in order to form the Δ connection. The output terminal 243 of the changeover switch 24w of W phase is connected to the other end of winding of W phase. The second input terminal 242 of the changeover switch 24w of W phase is connected to one end of the winding Cu of U phase in order to form the Δ connection.

About each of the changeover switches 24u, 24v, 24w of U phase, V phase, and W phase, the controller 25 moves each movable contact 245 by changing the conduction state to each coil 246, and switches the first winding connection state (Y connection) in which each movable contact 245 connects between the first input terminal 241 and the output terminal 243, and the second winding connection state (Δ connection) in which each movable contact 245 connects between the second input terminal 242 and the output terminal 243.

In the present embodiment, when energizing each coil 246 at a middle Duty ratio (for example, 50%), the movable contacts 245 move to an intermediate position connected to neither the first input terminal 241 nor the second input terminal 242, and are in a neutral winding connection state. In this state, the other ends of three-phase windings Cu, Cv, Cw become in the open state, and current does not flow into the three-phase windings Cu, Cv, Cw, regardless of the on-off state of the switching devices of the inverter 12.

<Inverter 12>

The inverter 12 is a power converter that converts between the DC power outputted from the power source switching mechanism 23 and the AC power supplied to the plural-phase windings 14 of the rotary electric machine body 2, and is provided with the switching devices. The inverter 12 is provided with three sets of series circuits where the positive electrode side switching device 121 connected to the positive pole wire and the negative electrode side switching device 122 connected to the negative pole wire are connected in series, corresponding to respective phases of the three-phase windings. The positive pole wire is connected to the positive electrode terminal side of the DC power source (in this example, the output terminal 233 of the power source switching mechanism 23), and the negative pole wire is connected to the negative electrode terminal side of the DC power source (in this example, the common ground). The connection point of the two switching devices 121, 122 for each phases is connected to the winding of the corresponding phase. MOSFET (Metal Oxide Semiconductor Field Effect Transistor), IGBT (Insulated Gate Bipolar Transistor) in which a diode is connected in reversely parallel, and the like is used for the switching devices.

A shunt resistance 123 as a current sensor 123 is connected in series to the series circuit of each phase. A both ends potential difference of each shunt resistance 123 is inputted into the input circuit 9 of the controller 25 as an output signal of the current sensor 123 (unillustrated). The gate terminal of each switching device is connected to the output circuit 11 of the controller 25. Therefore, each switching device is turned on or turned off by the control signal outputted from the output circuit 11 of the controller 25. A power source voltage sensor for detecting the DC voltage supplied to the inverter 12 is provided, and an output signal of the power source voltage sensor is inputted into the input circuit 9 of the controller 25 (unillustrated).

<Controller 25>

The controller 25 controls the power source switching mechanism 23, the winding connection switching mechanism 24, and the inverter 12. Each control of the controller 25 is realized by processing circuits provided in the controller 25. Specifically, the controller 25 is provided with an arithmetic processors 10 such as CPU (Central Processing Unit), storage apparatuses 33, an input circuit 9 which inputs external signals into the arithmetic processor 10, an output circuit 11 which outputs signals from the arithmetic processor 10 to the outside, and a power supply circuit 8 which supplies power to each part of the controller 25.

As the arithmetic processor 10, ASIC (Application Specific Integrated Circuit), IC (integrated Circuit), DSP (Digital Signal Processor), FPGA (Field Programmable Gate Array), various kinds of logical circuits, various kinds of signal processing circuits, and the like may be provided. As the arithmetic processor 10, a plurality of the same type ones or the different type ones may be provided, and each processing may be shared and executed. As the storage apparatuses 33, a RAM (Random Access Memory) which can read data and write data from the arithmetic processor 10, a ROM (Read Only Memory) which can read data from the arithmetic processor 10, and the like are provided. The input circuit 9 is connected with various kinds of sensors and signal wires such as the rotation sensor 13, the current sensor 123, a power source voltage sensor (unillustrated), a steering sensor 17, and a vehicle signal 22; and is provided with an A/D converter and the like for inputting signals of these sensors and signal wires into the arithmetic processor 10. The output circuit 11 is connected with electric loads such as the gate terminals of respective switching devices of the inverter 12, the driving terminals 234 of the power source switching mechanism 23, the driving terminals 244 of the winding connection switching mechanism 24, and the power source relay circuit 31; and is provided with driving circuits and the like for outputting control signals to these electric loads from the arithmetic processor 10.

The arithmetic processor 10 runs software items (programs) stored in the storage apparatus 33 and collaborates with other hardware devices in the controller 25, such as the storage apparatus 33, the input circuit 9, the output circuit 11, and the power supply circuit 8, so that the respective controls of the controller 25 are realized.

<Problem Explanation>

If only one DC power source is used as a power source of the rotary electric machine apparatus 1, when abnormality occur in one DC power source, operation of the rotary electric machine becomes impossible. Then, it is desirable to use two DC power sources as a power source of the rotary electric machine apparatus 1. However, when voltages of two DC power sources are different each other, if the induced voltage constant of windings is set in accordance with the DC power source with higher voltage, disadvantage occurs when using the DC power source with lower voltage. On the contrary, if the induced voltage constant of windings is set in accordance with the DC power source with lower voltage, disadvantage occurs when using the DC power source with higher voltage. Then, when switching and using two DC power sources, it is desirable to change the induced voltage constant of windings in accordance with the voltage of the switched DC power source.

The relationship between voltage of the DC power source and the induced voltage constant of windings will be explained in more detail below. As shown in a next equation, an induced voltage constant KeY (it is also called back electromotive force constant) of Y connection becomes √3 times (1.732 times) larger than an induced voltage constant KeΔ of Δ connection. A winding resistor RY between the lines of Y connection becomes 3 times larger than a winding resistor RΔ between the lines of Δ connection.

$$KeY = \sqrt{3} \times Ke\Delta \quad (1)$$

$$RY = 3 \times R\Delta$$

By the way, generally, as shown in a next equation, an induced voltage Ve [V] generated in windings becomes a value obtained by multiplying the rotational speed ω[rad/s] of the rotor to the induced voltage constant Ke[V·s/rad].

$$Ve = Ke \times \omega \quad (2)$$

As shown in a next equation, a current I [A] flowing through windings becomes a value obtained by dividing a value obtained by subtracting an induced voltage Ve [V] from an applied voltage Va [V] applied to windings, by a resistance R [Ω] of windings.

$$I = (Va - Ve)/R \quad (3)$$

As shown in a next equation, an output torque T [N·m] of the rotary electric machine body 2 becomes a value obtained by multiplying the current I [A] flowing through windings to a torque constant Kt [N·m/A]. The induced voltage constant Ke is proportional to the torque constant Kt.

$$T = Kt \times I \quad (4)$$

$$Kt = \beta \times Ke$$

Since the induced voltage constant Ke is proportional to the torque constant Kt, a current I required for generating the same torque T can be small as the induced voltage constant Ke becomes large. Therefore, as the induced voltage constant Ke becomes large, it is advantageous for suppressing unnecessary heat generation of apparatus and improving reliability of apparatus.

On the other hand, in a certain rotational speed ω, an applied voltage Va required for flowing a certain current I through windings becomes large as the induced voltage constant Ke and the resistance R of windings become large. Accordingly, in the state where windings is set to Y connection and the induced voltage constant Ke and the resistance R of windings became large, when the power source voltage becomes low, an operating range (a combination range of rotational speed and torque) where equivalent current can be flowed becomes narrow, and the characteristics of the rotary electric machine is deteriorated.

Then, even if it is configured that two DC power sources whose voltage are different each other are used selectively, and windings of fixed connection with a small induced voltage constant (for example, windings of Δ connection) is used in accordance with the DC power source with lower voltage, when operating using the DC power source with higher voltage, although the characteristics of the rotary electric machine is not deteriorated, current becomes large with respect to voltage, unnecessary heat generation of apparatus is caused, and reliability of apparatus is deteriorated. On the contrary, if windings of fixed connection with a large induced voltage constant (for example, windings of Y connection) is used in accordance with the DC power source with higher voltage, when operating using the DC power source with lower voltage and trying to output high torque, shortage of voltage occurs, and characteristics of the rotary electric machine is deteriorated. Therefore, it is desirable to switch to a winding connection which has an appropriate induced voltage constant, according to change of the DC power source.

<Switching Control of Winding Connection>

Then, in the present embodiment, the controller 25 switches the power source switching mechanism 23, switches the winding connection switching mechanism 24 according to a switching state of the power source switching mechanism 23, and drives on/off the switching devices of the inverter 12 to control the rotary electric machine body 2, based on the switching state of the power source switching mechanism 23 and a switching state of the winding connection switching mechanism 24.

According to this configuration, since the power source switching mechanism 23 is switched to the first power source connection state where DC power of the first DC power source 5a of high voltage is outputted, or the second power source connection state where DC power of the second DC power source 5b of low voltage is outputted, for example, when abnormality is caused in one DC power source, the rotary electric machine apparatus 1 can be operated using the other DC power source. Then, since the winding connection switching mechanism 24 is switched to the first winding connection state where the induced voltage constant of windings is high, or the second winding connection state where the induced voltage constant of windings is low, according to the switching state of the power source switching mechanism 23, the induced voltage constant of windings can be changed appropriately according to change of the DC voltage. Then, according to change of the DC voltage, and change of the induced voltage constant of windings, the switching devices of the inverter 12 is controlled on/off appropriately, and the rotary electric machine body 2 can be controlled.

In the present embodiment, when switching the power source switching mechanism 23 to the first power source connection terminal 6a side connection of high voltage, the controller 25 switches the winding connection switching mechanism 24 so that the three-phase windings become the first winding connection state (in this example, Y connection) of high induced voltage constant. On the other hand, when switching the power source switching mechanism 23 to the second power source connection terminal 6b side connection of low voltage, the controller 25 switches the winding connection switching mechanism 24 so that the three-phase windings becomes the second winding connection state (in this example, Δ connection) of low induced voltage constant.

According to this configuration, since the induced voltage constant of windings is set to high when the first DC power source 5a of high voltage is used, current required for generating the same torque can be lowered, heat generation of apparatus can be suppressed, and reliability of apparatus can be improved. On the other hand, since the induced voltage constant of windings is set to low when the second DC power source 5b of low voltage is used, even when outputting high torque, occurrence of voltage shortage can be suppressed, and deterioration of characteristics of the rotary electric machine can be suppressed. Therefore, even if the DC power source is switched to the high voltage or the low voltage, the induced voltage constant of windings can be switched appropriately and the rotary electric machine can be operated well.

The controller 25 switches the power source switching mechanism 23 to the second power source connection state when determining that abnormality occurs in the first DC power source 5a, and switches the power source switching mechanism 23 to the first power source connection state when determining that abnormality occurs in the second DC power source 5b. On the other hand, when determining that abnormality occurs in neither the first nor the second DC power sources 5a, 5b, the controller 25 switches the power source switching mechanism 23 to an initial connection state which is preliminarily set to either one of the first power source connection state and the second power source connection state.

The controller 25 switches the power source switching mechanism 23 to the first power source connection state or the second power source connection state by turning on or off the control signal to the driving terminals 234 of the power source switching mechanism 23. The controller 25 switches the winding connection switching mechanism 24 to the first winding connection state or the second winding connection state by turning on or off the control signal to the driving terminals 244 of the winding connection switching mechanism 24. In the present embodiment, when determining that control system of the rotary electric machine apparatus 1 such as the inverter 12 failed, the controller 25 switches the winding connection switching mechanism 24 to a neutral winding connection state which is not the first and the second winding connection states, by performing PWM (Pulse Width Modulation) drive of the control signal to the driving terminal 244 of the winding connection switching mechanism 24 at a middle Duty ratio (for example, 50%). Accordingly, occurrence of dynamic braking by short circuit of windings can be prevented.

The controller 25 calculates a current command of three-phase windings based on the torque command, the rotational speed, the switching state (DC voltage) of the power source switching mechanism 23, and the switching state of the winding connection switching mechanism 24. In this case, since the current command corresponding to the same torque command changes according to change of the induced voltage constant of windings and change of the DC voltage, the controller 25 switches one or both of setting data and setting method which are used for calculation of the current command of three-phase windings based on the torque command, according to the switching state of the winding connection switching mechanism 24 and the switching state of the power source switching mechanism 23.

In the present embodiment, the controller 25 calculates a torque command which assists a steering mechanism, based on a steering wheel torque which is detected based on the output signal of the steering sensor 17, and the vehicle signal 22 (for example, vehicle speed).

The controller 25 performs current feedback control that changes voltage commands applied to the three-phase windings so that the current detection values of three-phase windings approaches current commands of the three-phase windings. Setting of the current commands of the three-phase windings and the current feedback control are performed on a dq-axis rotating coordinate system. The dq-axis rotating system consists of a d-axis defined in the direction of the N pole (magnetic pole position) of the permanent magnet provided in the rotor and a q-axis defined in the direction advanced to d-axis by 90 degrees (π/2) in an electrical angle, and which is the two-axis rotating coordinate system which rotates synchronizing with rotation of the rotor in the electrical angle.

The controller 25 detects the rotational angle speed and the rotational angle (magnetic pole position) of the rotor based on the output signal of the rotation speed sensor 13, and detects the currents which flow into the three-phase windings based on the output signal of the current sensor 123, and detects the DC voltage supplied to the inverter 12 based on the output signal of the voltage sensor.

The controller 25 performs PWN (Pulse Width Modulation) control that controls on/off each switching device based on the voltage commands of the three-phase windings, and the switching stage (DC voltage) of the power source switching mechanism 23. The controller 25 compares the voltage command of each phase with a carrier wave (triangular wave) which oscillates with an amplitude of the DC voltage, generates an on/off control signal of each phase based on the comparison result, and outputs it to the gate terminal of corresponding switching device.

<Electric Power Steering Apparatus>

Figure 5:
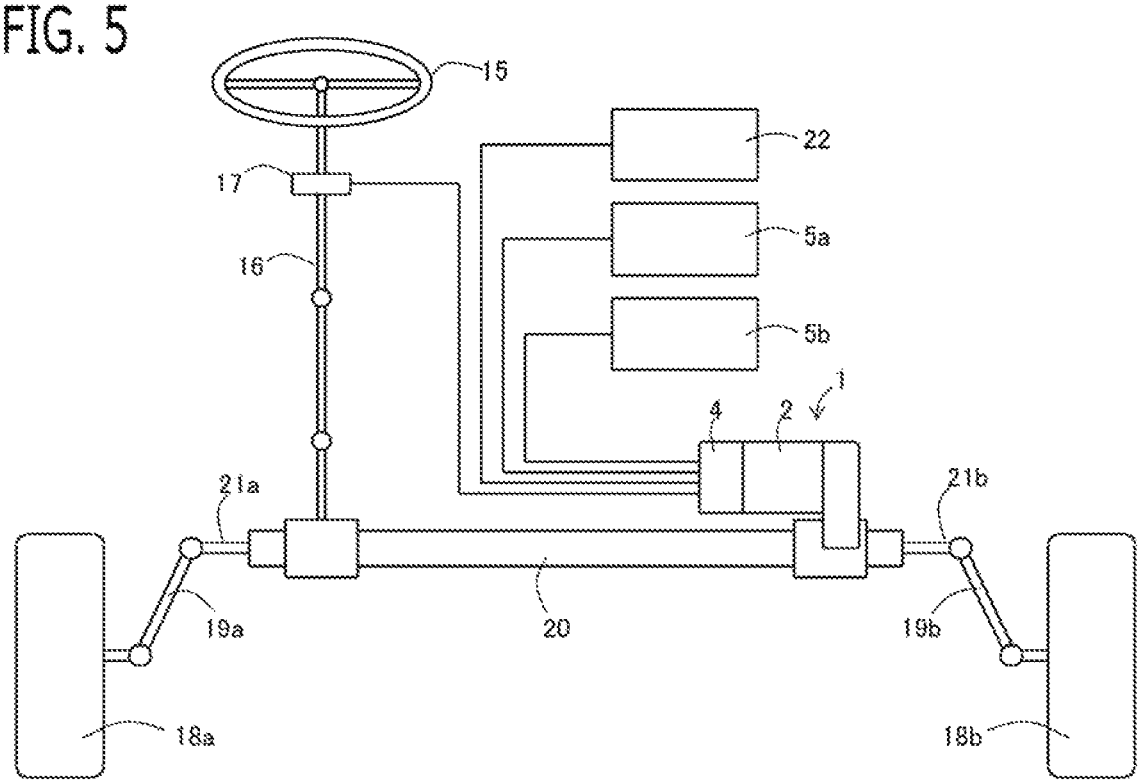
FIG. 5 is a schematic configuration diagram of the electric power steering apparatus according to Embodiment 1.

As mentioned above, the driving force of the rotary electric machine body 2 is the driving force source of the steering device of vehicle, and the rotary electric machine apparatus 1 is built into the electric power steering apparatus. As shown in FIG. 5, a handle 15 which a driver operates is connected with a steering shaft 16. The steering sensor 17 which detects one or both of a steering angle and a steering wheel torque of driver is attached to the steering shaft 16. Tie rods 21a, 21b connected to a rack shaft 20 are connected to steering knuckle arms 19a, 19b of front wheels 18a, 18b which are steering control wheels. A motion of the rack shaft 20 transmits to the front wheels 18a, 18b through the tie rods 21a, 21b and the steering knuckle arms 19a, 19b, and the front wheels 18a, 18b are steered. The rotary electric machine apparatus 1 which is a steering motor is attached to the rack shaft 20, and the output torque of the rotary electric machine apparatus 1 is a power to move the rack shaft 20. The rotary electric machine apparatus 1 controls the output torque of the rotary electric machine based on the output signal of the steering sensor 17 and the vehicle signal such as the vehicle speed, and steering according to driver operation is performed.

<Rotary Electric Machine Apparatus 1 Which is Integrally Configured>

Figure 6:
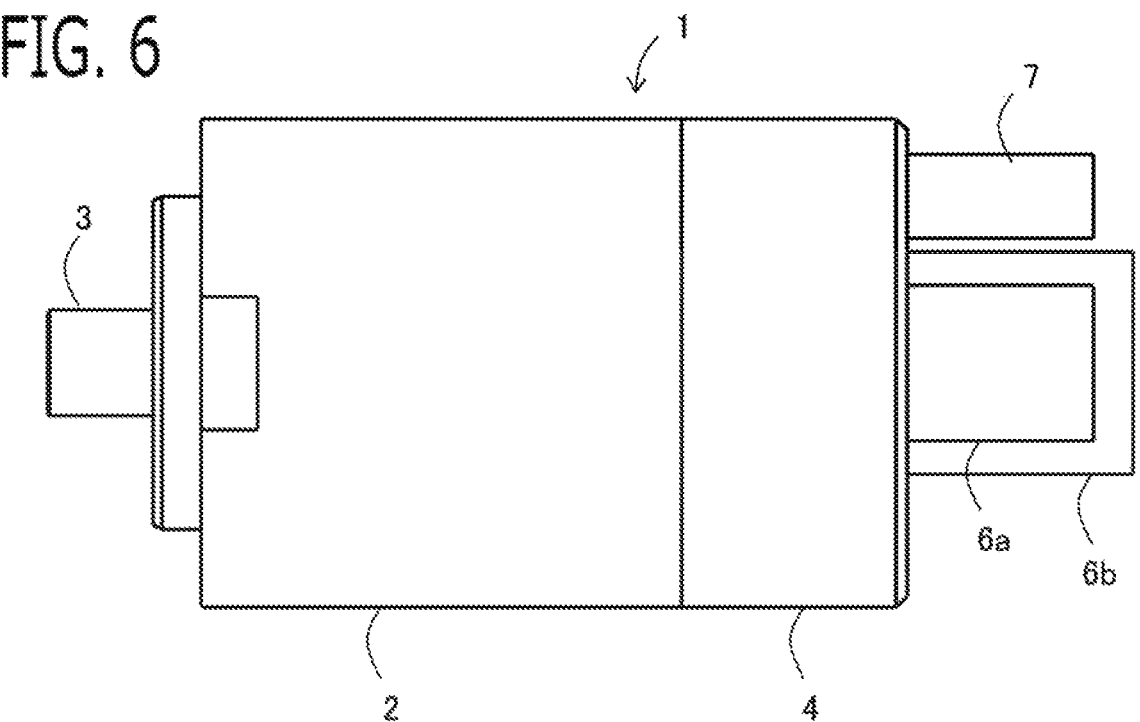
FIG. 6 is a side view of the rotary electric machine apparatus configured integrally according to Embodiment 1.
Figure 7:
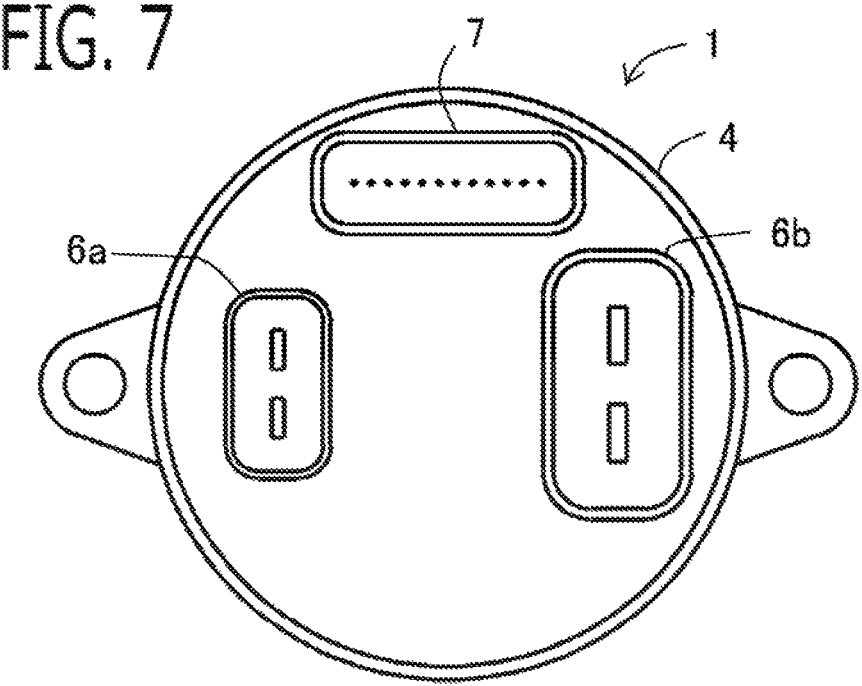
FIG. 7 is a side view of the rotary electric machine apparatus configured integrally according to Embodiment 1.

As shown in FIG. 6 and FIG. 7, the first power source connection terminal 6a, the second power source connection terminal 6b, the power source switching mechanism 23, the rotary electric machine body 2, the winding connection switching mechanism 24, the inverter 12, and the controller 25 are configured integrally. FIG. 6 is a side view of the rotary electric machine apparatus 1 configured integrally. FIG. 7 is a side view which observed the connection terminal side of the rotary electric machine apparatus 1. An output shaft 3 to which the driving force of the rotor is outputted projects from the rotary electric machine body 2 to one side of the axial direction. The output shaft 3 is connected to a power transfer mechanism such as the rack shaft 20 by a gear mechanism and the like. In the other side of the axial direction of the rotary electric machine body 2, the inverter 12, the controller 25, the power source switching mechanism 23, and the driving apparatus 4 such as the winding connection switching mechanism 24 are provided. The rotary electric machine body 2 and the driving apparatus 4 are stored in a cylindrical case. The connector of the first power source connection terminal 6a, the connector of the second power source connection terminal 6b, and the signal connector 7 for the steering sensor 17 and the vehicle signal 22 project from the driving apparatus 4 to the other side of the axial direction.

Embodiment 2

The rotary electric machine apparatus 1 according to Embodiment 2 will be explained. The explanation for constituent parts the same as those in Embodiment 1 will be omitted. Although the basic configuration of the rotary electric machine apparatus 1 according to the present embodiment is the same as that of Embodiment 1, the present embodiment is different from Embodiment 1 in that 2 sets of the plural-phase windings, the winding connection switching mechanisms, and the inverters are provided.

<First Set and Second Set of Windings>

Figure 8:
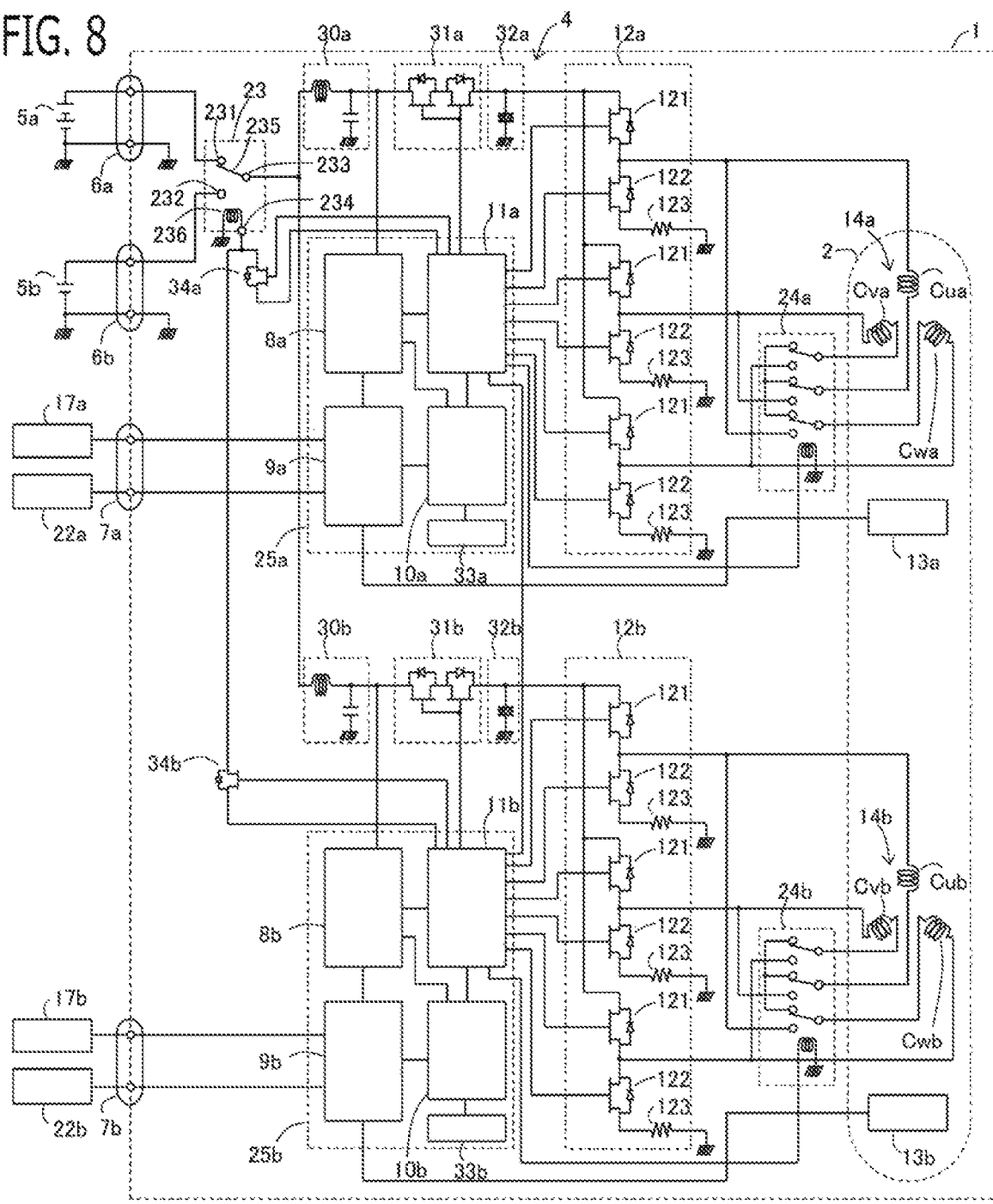
FIG. 8 is a circuit diagram of the rotary electric machine apparatus according to Embodiment 2.

FIG. 8 is a circuit diagram of the rotary electric machine apparatus 1 according to the present embodiment. The first set of plural-phase windings 14a and the second set of plural-phase windings 14b are provided in the stator of the one rotary electric machine body 2. As similar to Embodiment 1, the first set of plural-phase windings 14a is the three-phase windings Cua, Cva, Cwa, and the second set of plural-phase windings 14b is the three-phase windings Cub, Cvb, Cwb.

<First Set and Second Set of Winding Connection Switching Mechanisms>

The rotary electric machine apparatus 1 is provided with a first set of winding connection switching mechanism 24a which switches interconnection of the first set of three phase windings between the first winding connection state and the second winding connection state, and a second set of winding connection switching mechanism 24b which switches interconnection of the second set of three phase windings between the first winding connection state and the second winding connection state. As similar to Embodiment 1, the first set of winding connection switching mechanism 24a switches interconnection of the first set of three phase windings between the Y connection as the first winding connection state, and the Δ connection as the second winding connection state. The second set of winding connection switching mechanism 24b switches interconnection of the second set of three phase windings between the Y connection as the first winding connection state, and the Δ connection as the second winding connection state. Since the basic configuration of the winding connection switching mechanisms 24a, 24b of each set is the same as that of the winding connection switching mechanism 24 of Embodiment 1, explanation is omitted.

<First Set and Second Set of Inverters>

The rotary electric machine apparatus 1 is provided with a first set of inverter 12a which converts power supplied to the first set of plural-phase windings 14a, and a second set of inverter 12*b* which converts power supplied to the second set of plural-phase windings 14*b*. Since the inverter of each set is the same configuration as the inverter of Embodiment 1, explanation is omitted.

<Power Source Switching Mechanism>

Only one power source switching mechanism 23 is provided, and the DC power outputted from the power source switching mechanism 23 is supplied in parallel to the first set and the second set of inverters 12*a*, 12*b*, and the first set and the second set of controllers 25*a*, 25*b*. The power source switching mechanism 23 is switched by the first set of controller 25*a* or the second set of controller 25*b*.

A driving terminal 234 (in this example, one end of the coil 236) of the power source switching mechanism 23 is connected in parallel to an output circuit 11*a* of the first set of controller 25*a*, and an output circuit 11*b* of the second set of controller 25*b*. On a connection line between the driving terminal 234 of the power source switching mechanism 23 and the first set of controller 25*a*, a first set of relay circuit 34*a* is provided, and turns on and off the connection between the driving terminal 234 of the power source switching mechanism 23 and the first set of controller 25*a*. A driving terminal of the first set of relay circuit 34*a* is connected to the output circuit 11*a* of the first set of controller 25*a*, and is turned on and off by the output signal of the first set of controller 25*a*. Similarly, on a connection line between the driving terminal 234 of the power source switching mechanism 23 and the second set of controller 25*b*, a second set of relay circuit 34*b* is provided, and turns on and off the connection between the driving terminal 234 of the power source switching mechanism 23 and the second set of controller 25*b*. The driving terminal of the second set of relay circuit 34*b* is connected to the output circuit 11*b* of the second set of controller 25*b*, and is turned on and off by the output signal of the second set of controller 25*b*. The first set and the second set of relay circuits 34*a*, 34*b* may be electromagnetic relays, or may be switching devices such as FET.

The power source switching mechanism 23 may also be duplicated. That is to say, a first set of power source switching mechanism which switches the DC power supplied, to the first set of inverter 12*a* and the first set of controller 25*a*, and a second set of power source switching mechanism which switches the DC power supplied to the second set of inverter 12*b* and the second set of controller 25*b* may be provided. And, the power source switching mechanism of each set may be controlled by the controller of corresponding set.

On a connection path between the output terminal 233 of the power source switching mechanism 23 and a positive pole wire of the first set of inverter 12*a*, a first set of low pass filter circuit 30*a*, a first set of power source relay circuit 31*a*, and a first set of smoothing capacitor 32*a* are provided. On a connection path between the output terminal 233 of the power source switching mechanism 23 and a positive pole wire of the second set of inverter 12*b*, a second of low pass filter circuit 30*b*, a second of power source relay circuit 31*b*, and a second set of smoothing capacitor 32*b* are provided.

<Duplication of Various Sensors>

Various kinds of sensors are also duplicated. For example, the rotary electric machine apparatus 1 is provided with a set of rotation sensor 13*a*, a second set of rotation sensor 13*b*, a first set of current sensor 123, a second set of current sensor 123, a first set of power source voltage sensor (unillustrated), and a second set of power source voltage sensor (unillustrated). An output signal of a first set of steering sensor 17*a* and an output signal of a second set of steering sensor 17*b* are inputted into the rotary electric machine apparatus 1. A vehicle signal 22*a* for first set and a vehicle signal 22*b* for second set are inputted into the rotary electric machine apparatus 1. The output signals of the various sensors of each set are inputted into the controller of corresponding set.

<First Set and Second Set of Controllers>

The rotary electric machine apparatus 1 is provided with the first set of controller 25*a* which controls the first set of inverter 12*a* and the first set of winding connection switching mechanism 24*a*, and the second set of control 25*b* which controls the second set of inverter 12*b* and the second set of winding connection switching mechanism 24*b*. The first set of controller 25*a* is provided with a first set of arithmetic processor 10*a*, a first set of storage apparatus 33*a*, a first set of input circuit 9*a*, a first set of output circuit 11*a*, and a first set of power supply circuit 8*a*. The second set of controller 25*b* is provided with a second set of arithmetic processor 10*b*, a second set of storage apparatus 33*b*, a second set of input circuit 9*b*, a second set of output circuit 11*b*, and a second set of power supply circuit 8*b*. The first set of controller 25*a* and the second set of controller 25*b* communicate to each other via a communication line. Since the basic configuration of each set of controllers 25*a*, 25*b* is the same as that of the controller 25 of Embodiment 1, explanation is omitted.

<Control of Power Source Switching Mechanism>

The first set and the second set of controllers 25*a*, 25*b* switch the power source switching mechanism 23. When abnormality occurs in the first set of controller 25*a*, the second set of controller 25*b* turns on the second set of relay circuit 34*b*, and switches the power source switching mechanism 23, as similar to Embodiment 1. When abnormality occurs in the first set of controller 25*a*, the first set of relay circuit 34*a* is turned off. When abnormality occurs in the second set of controller 25*b*, the first set of controller 25*a* turns on the first set of relay circuit 34*a*, and switches the power source switching mechanism 23, as similar to Embodiment 1. When abnormality occurs in the second set of controller 25*b*, the second set of relay circuit 34*b* is turned off.

The first set of controller 25*a* and the second set of controller 25*b* are communicating mutually, and determine whether abnormality occurred in the other side. When abnormality does not occur in both of the first set and the second set of controllers 25*a*, 25*b*, the controller of a predetermined set switches the power source switching mechanism 23.

<Switching of Winding Connection State>

As similar to Embodiment 1, the first set of controller 25*a* switches the first set of winding connection switching mechanism 24*a* so that the first set of three-phase windings becomes the first winding connection state (Y connection) or the second winding connection state (Δ connection), and drives on/off the switching devices of the first set of inverter 12*a* based on the switching state of the power source switching mechanism 23, and the switching state of the first set of three-phase windings in the first set of winding connection switching mechanism 24*a*.

Similarly, the second set of controller 25*b* switches the second set of winding connection switching mechanism 21*b* so that the second set of three-phase windings become the first winding connection state (Y connection) or the second winding connection state (Δ connection), and drives on/off the switching devices of the second set of inverter 12*b* based on the switching state of the power source switching mechanism 23, and the switching state of the second set of three-phase windings in the second set of winding connection switching mechanism 24b.

As similar to Embodiment 1, when switching the power source switching mechanism 23 to the first power source connection terminal 6a side connection of high voltage, the first set of controller 25a switches the first set of winding connection switching mechanism 24a so that the first set of three-phase windings becomes the first winding connection state (Y connection). When switching the power source switching mechanism 23 to the second power source connection terminal 6b side connection of low voltage, the first set of controller 25a switches the first set of winding connection switching mechanism 24a so that the first set of three-phase windings becomes the second winding connection state (Δ connection).

As similar to Embodiment 1, when switching the power source switching mechanism 23 to the first power source connection terminal 6a side connection of high voltage, the second set of controller 25b switches the second set of winding connection switching mechanism 24b so that the second set of three-phase windings becomes the first winding connection state (Y connection). When switching the power source switching mechanism 23 to the second power source connection terminal 6b side connection of low voltage, the second set of controller 25b switches the second set of winding connection switching mechanism 24b so that the second set of three-phase windings becomes the second winding connection state (Δ connection).

<Control of First Set Of Inverter>

As similar to Embodiment 1, the first set of controller 25a calculates a current command of the first set of three-phase windings based on a first set of torque command, rotational speed, the switching state (DC voltage) of the power source switching mechanism 23, and the switching state of the first set of winding connection switching mechanism 24a. In this case, since the first set of current command corresponding to the same first set of torque command changes according to change of the induced voltage constant of windings and change of the DC voltage, the first set of controller 25a switches one or both of setting data and setting method which are used for calculation of current commands of the first set of three-phase windings based on the first set of torque command, according to the switching state of the first set of winding connection switching mechanism 24a and the switching state of the power source switching mechanism 23.

The first set of controller 25a calculates the first set of torque command which assists the steering mechanism, based on the steering wheel torque detected based on the output signal of the first set of steering sensor 17a, and the vehicle signal 22a (for example, vehicle speed) for first set.

The first set of controller 25a performs current feedback control that changes voltage commands applied to the first set of three-phase windings so that the current detection values of the first set of three-phase windings approaches the current commands of the first set of three-phase windings. Setting of the current commands of the first set of three-phase windings and the current feedback control are performed on a dq-axis rotating coordinate system.

The first set of controller 25a detects the rotational speed and the rotational angle (magnetic pole position) of the rotor based on the output signal of the first set of rotation sensor 13a, detects currents which flows into the first set of three-phase windings based on the output signal of the first set of current sensor 123, and detects the DC voltage supplied to the first set of inverter 12a based on the output signal of the first set of voltage sensor.

The first set of controller 25a performs PWM control that controls on/off each switching device of first set, based on the voltage commands of the first set of three-phase windings, and the switching state (DC voltage) of the power source switching mechanism 23. The first set of controller 25a compares the voltage command of each phase of first set with the carrier wave (triangular wave) which oscillates with the amplitude of DC voltage, generates the on/off control signal of each phase of first set based on the comparison result, and outputs it to the gate terminal of the corresponding switching device of first set.

<Control of Second Set of Inverter>

As similar to Embodiment 1, the second set of controller 25b calculates a current command of the second set of three-phase windings based on a second set of torque command, rotational speed, the switching state (DC voltage) of the power source switching mechanism 23, and the switching state of the second set of finding connection switching mechanism 24b. In this case, since the second set of current command corresponding to the same second set of torque command changes according to change of the induced voltage constant of windings and change of the DC voltage, the second set of controller 25b switches one or both of setting data and setting method which are used for calculation of current commands of the second set of three-phase windings based on the second set of torque command, according to the switching state of the second set of winding connection switching mechanism 24b and the switching state of the power source switching mechanism 23.

The second set of controller 25b calculates the second set of torque command which assists the steering mechanism, based on the steering wheel torque detected based on the output signal of the second set of steering sensor 17b, and the vehicle signal 22b (for example, vehicle speed) for second set.

The second set of controller 25b performs current feedback control that changes voltage commands applied to the second set of three-phase windings so that the current detection values of the second set of three-phase windings approaches the current commands of the second set of three-phase windings. Setting of the current commands of the second set of three-phase windings and the current feedback control are performed on a dq-axis rotating coordinate system.

The second set of controller 25b detects the rotational speed and the rotational angle (magnetic pole position) of the rotor based on the output signal of the second set of rotation sensor 13b, detects currents which flows into the second set of three-phase windings based on the output signal of the second set of current sensor 123, and detects the DC voltage supplied to the second set of inverter 12b based on the output signal of the second set of voltage sensor.

The second set of controller 25b performs PWM control that controls on/off each switching device of second set, based on the voltage commands of the second set of three-phase windings, and the switching state (DC voltage) of the power source switching mechanism 23. The second set of controller 25b compares the voltage command of each phase of second set with the carrier wave (triangular wave) which oscillates with the amplitude of DC voltage, generates the on/off control signal of each phase of second set based on the comparison result, and outputs it to the gate terminal of the corresponding switching device of second set.

<Electric Power Steering Apparatus>

Figure 9:
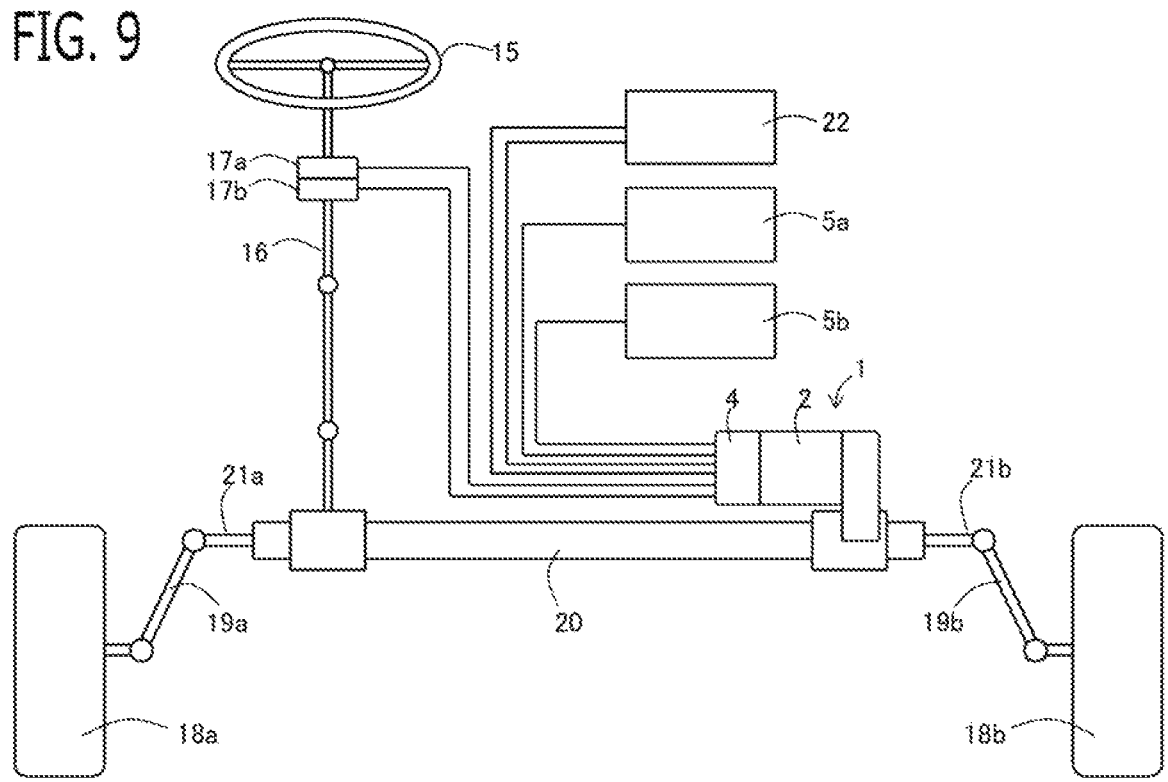
FIG. 9 is a schematic configuration diagram of the electric power steering apparatus according to Embodiment 2.

As similar to Embodiment 1, the driving force of the rotary electric machine body 2 is the driving force source of the steering device of vehicle, and the rotary electric machine apparatus 1 is built into the electric power steering apparatus. As shown in FIG. 9, unlike Embodiment 1, the first set of steering sensor 17a and the second set of steering sensor 17b which detect one or both of a steering angle and a steering wheel torque of driver are attached to the steering shaft 16.

<Rotary Electric Machine Apparatus 1 Which is Integrally Configured>

Figure 10:
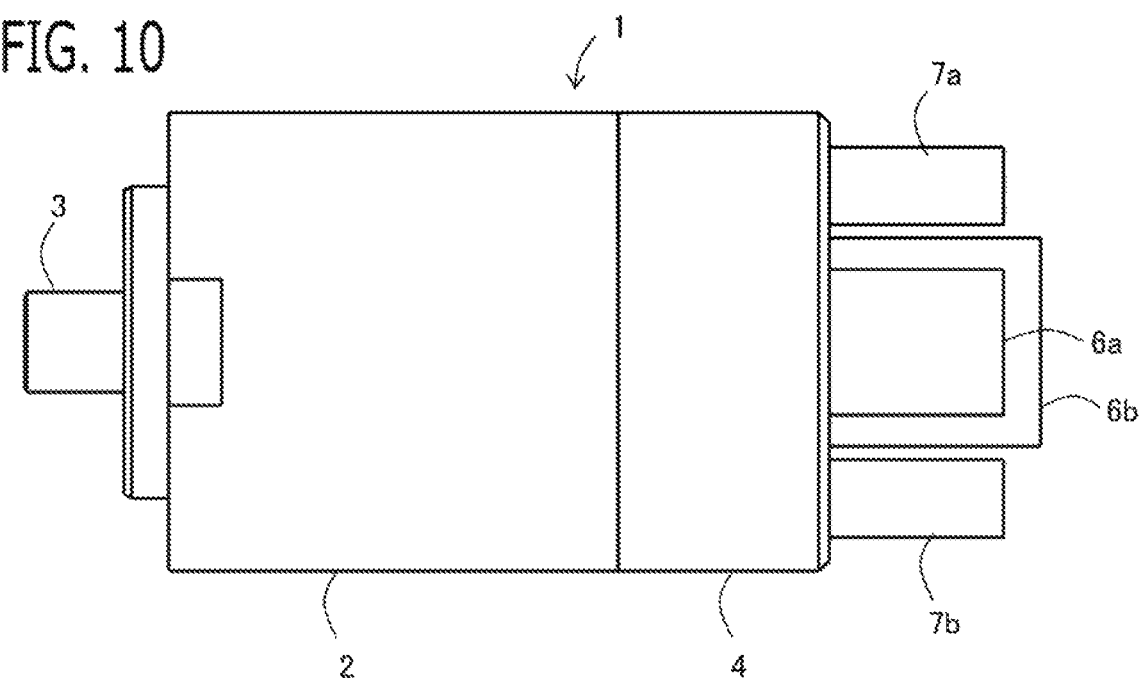
FIG. 10 is a side view of the rotary electric machine apparatus configured integrally according to Embodiment 2.
Figure 11:
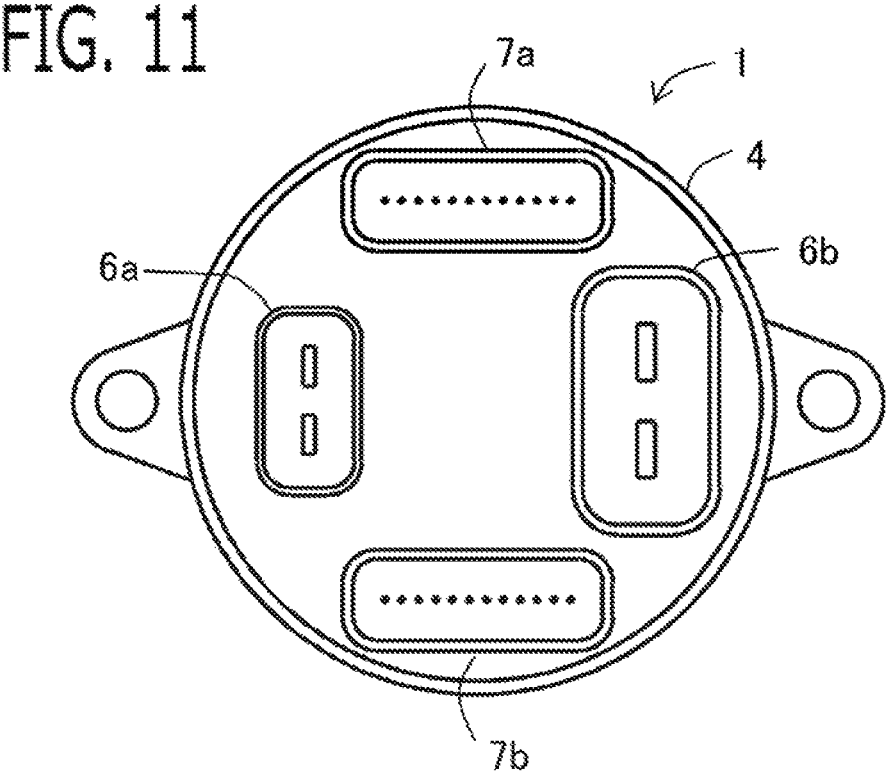
FIG. 11 is a side view of the rotary electric machine apparatus configured integrally according to Embodiment 2.

As shown in FIG. 10 and FIG. 11, the first power source connection terminal 6a, the second power source connection terminal 6b, the power source switching mechanism 23, the rotary electric machine body 2, the winding connection switching mechanism 24, the inverter 12, and the controller 25 are configured integrally. FIG. 10 is a side view of the rotary electric machine apparatus 1 configured integrally. FIG. 11 is a side view which observed the connection terminal side of the rotary electric machine apparatus 1. An output shaft 3 to which the driving force of the rotor is outputted projects from the rotary electric machine body 2 to one side of the axial direction. The output shaft 3 is connected to a power transfer mechanism such as the rack shaft 20 by a gear mechanism and the like. In the other side of the axial direction of the rotary electric machine body 2, the first set and the second set of inverters, the first set and the second set of controllers, the power source switching mechanism 23, and the driving apparatus 4 such as the first set and the second set of winding connection switching mechanisms are provided. The rotary electric machine body 2 and the driving apparatus 4 are stored in a cylindrical case. The connector of the first power source connection terminal 6a, the connector of the second power source connection terminal 6b, the signal connector 7a of the first set of steering sensor 17a and the vehicle signal 22a for first set, and the signal connector 7b of the second set of steering sensor 17b and the vehicle signal 22b for second set project from the driving apparatus 4 to the other side of the axial direction.

According to the Embodiment 2, when one DC power source has abnormality, the other DC power source can be used and the rotary electric machine apparatus 1 can be operated. And, even if the DC power source is switched to the high voltage or the low voltage, the induced voltage constant of each set windings can be switched appropriately and the rotary electric machine can be operated well. Since 2 sets of the three-phase windings, the winding connection switching mechanisms, the inverters, the controllers, and the like are provided and duplicated, even if abnormality occurs in one set, in the state where the induced voltage constant of the windings of the other set is switched appropriately, the rotary electric machine can output torque by the windings of the other set. Therefore, the function of the rotary electric machine is not lost completely and the reliability of apparatus can be improved more.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the first DC power source 5a is the DC power source of 48V, and the second DC power source 5b is the DC power source of 12V. However, embodiments of the present disclosure are not limited to the foregoing case. That is to say, as long as a voltage of the second DC power source 5b is lower than a voltage of the first DC power source 5a, a voltage of the first DC power source 5a and a voltage of the second DC power source 5b may be set to any voltage.

(2) In each of the above-mentioned Embodiments, there has been explained the case where when abnormality occurs in the first DC power source 5a or the second DC power source 5b, the power source switching mechanism 23 is switched to connection with the DC power source in which abnormality does not occur. However, embodiments of the present disclosure are not limited to the foregoing case. That is to say, the controller may switch the power source switching mechanism 23 based on other conditions. For example, when determining that the rotational speed of the rotary electric machine is a low rotational speed lower than a preliminarily set determination rotational speed, the controller may switch the power source switching mechanism 23 to the second power source connection state of low voltage, and switch the winding connection switching mechanism 24 to the second winding connection state ($\Delta$ connection) with a low induced voltage constant. When determining that the rotational speed of the rotary electric machine is a high rotational speed higher than the determination rotational speed, the controller may switch the power source switching mechanism 23 to the first power source connection state of high voltage, and switch the winding connection switching mechanism 24 to the first winding connection state (Y connection) with a high induced voltage constant. Alternatively, when determining that charge amount of the first DC power source 5a or the second DC power source 5b is dropped, the controller may switch the power source switching mechanism 23 to connection with the DC power source whose charge amount is not dropped.

(3) In each of the above-mentioned Embodiments, there has been explained the case where the winding connection switching mechanism 24 switches between the Y connection as the first winding connection state, and the $\Delta$ connection as the second winding connection state. However, embodiments of the present disclosure are not limited to the foregoing case. That is to say, the winding connection switching mechanism 24 may switch, as the first winding connection state, to a connection other than the Y connection in which an induced voltage constant of windings becomes higher, and may switch, as the second winding connection state, to a connection other than the $\Delta$ connection in which an induced voltage constant of windings becomes lower.

(4) In each of the above-mentioned Embodiments, there has been explained the case where the driving force of the rotary electric machine body 2 is the driving force source of the steering device of vehicle. However, embodiments of the present disclosure are not limited to the foregoing case. That is to say, the driving force of the rotary electric machine body 2 may be a driving force source of other apparatus, such as wheels, for example. Alternatively, the rotary electric machine apparatus 1 may function as a generator, the power generated by the rotary electric machine apparatus 1 may be supplied to the first DC power source 5a or the second DC power source 5b switched by the power source switching mechanism 23.

(5) In the above-mentioned Embodiment 2, there has been explained the case where as the controller, the first set and the second set of controllers 25a, 25b are provided, and two arithmetic processors (CPU) are provided. However, embodiments of the present disclosure are not limited to the foregoing case. That is to say, one controller which is provided with one arithmetic processor (CPU) may control two set of the inverters and the winding connection switching mechanisms.

(6) In each of the above-mentioned Embodiments, there has been explained the case where the rotary electric machine apparatus 1 is configured integrally. However, embodiments of the present disclosure are not limited to the foregoing case. That is to say, each part of the rotary electric machine apparatus 1 may be configured by a plurality of units separately in arbitrary combinations.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Rotary electric machine apparatus, 2 Rotary electric machine body, 12 Inverter, 23 Power source switching mechanism, 24 Winding connection switching mechanism, 25 Controller, 5a First DC power source, 5b Second DC power source, 6a First power source connection terminal, 6b Second power source connection terminal

What is claimed is:

1. A rotary electric machine apparatus comprising:
a first power source connection terminal to which a first DC power source is connected;
a second power source connection terminal to which a second DC power source whose voltage is lower than the first DC power source is connected;
a power source switching mechanism that switches between a DC power supplied to the first power source connection terminal and a DC power supplied to the second power source connection terminal, and outputs one of the DC power supplied to the first power source connection terminal and the DC power supplied to the second power source connection terminal;
a rotary electric machine body having plural-phase windings;
a winding connection switching mechanism that switches interconnection of the plural-phase windings between a first winding connection state, and a second winding connection state in which an induced voltage constant of windings becomes lower than the first winding connection state;
an inverter that is provided with switching devices, and converts a DC power outputted from the power source switching mechanism and into an AC power supplied to the plural-phase windings; and
a controller that switches the power source switching mechanism, switches the winding connection switching mechanism according to a switching state of the power source switching mechanism, and drives on/off the switching devices to control the rotary electric machine body based on a switching state of the power source switching mechanism and a switching state of the winding connection switching mechanism;
wherein when switching the power source switching mechanism to the first power source connection terminal, the controller switches the winding connection switching mechanism so that the plural-phase windings become the first winding connection state,
when switching the power source switching mechanism to the second power source connection terminal, the controller switches the winding connection switching mechanism so that the plural-phase windings become the second winding connection state,
wherein the rotary electric machine body is provided with three-phase windings as the plural-phase windings, and
wherein the winding connection switching mechanism is a switching mechanism which switches interconnection of the three-phase windings between Y connection as the first winding connection state, and Δ connection as the second winding connection state.

2. The rotary electric machine apparatus according to claim 1, wherein two sets of the plural-phase windings, the winding connection switching mechanisms, and the inverters are provided,
wherein each set of the winding connection switching mechanism switches interconnection of the plural-phase windings of corresponding set between the first winding connection state and the second winding connection state, and
wherein the controller switches the power source switching mechanism, switches each set of the winding connection switching mechanism so that each set of the plural-phase windings becomes the first winding connection state or the second winding connection state, and drives on/off each set of the switching devices to control the rotary electric machine body, based on the switching state of the power source switching mechanism, and the switching state of each set of the plural-phase windings in each set of the winding connection switching mechanism;
wherein when switching the power source switching mechanism switches to the first power source connection terminal, the controller switches each set of the winding connection switching mechanism so that each set of the plural-phase windings become the first winding connection state,
when switching the power source switching mechanism switches to the second power source connection terminal, the controller switches each set of the winding connection switching mechanism so that each set of the plural-phase windings become the second winding connection state,
wherein the rotary electric machine body is provided with three-phase windings as each set of the plural-phase windings, and
wherein each set of the winding connection switching mechanism is a switching mechanism which switches interconnection of the three-phase windings of corresponding set between Y connection as the first winding connection state, and Δ connection as the second winding connection state.

3. The rotary electric machine apparatus according to claim 2,
wherein when determining that any one set of the inverters failed, the controller switches the failed set of the winding connection switching mechanism to a neutral winding connection state which is not the first and the second winding connection states.

4. The rotary electric machine apparatus according to claim 1, wherein a driving force of the rotary electric machine body is a driving force source of a steering device of vehicle.

5. The rotary electric machine apparatus according to claim 1, wherein the first power source connection terminal, the second power source connection terminal, the power source switching mechanism, the rotary electric machine body, the winding connection switching mechanism, the inverter, and the controller are configured integrally.

6. The rotary electric machine apparatus according to claim 1,
wherein the controller calculates current commands, based on a torque command, a rotational speed, a switching state of the power source switching mechanism, and a switching state of the winding connection switching mechanism; the controller calculates changes voltage commands so that current detection values approaches the current commands; and the controller calculates controls on/off the switching devices based on the voltage commands.

7. The rotary electric machine apparatus according to claim 6,
wherein the controller switches one or both of setting data and setting method which are used for calculation of the current commands based on the torque command, according to the switching state of the winding connection switching mechanism and the switching state of the power source switching mechanism.

8. The rotary electric machine apparatus according to claim 6,
wherein the controller changes the current commands corresponding to the same torque command, based on the switching state of the winding connection switching mechanism and the switching state of the power source switching mechanism.

9. The rotary electric machine apparatus according to claim 1,
wherein when determining that the inverter failed, the controller switches the winding connection switching mechanism to a neutral winding connection state which is not the first and the second winding connection states.

\* \* \* \* \*